United States Patent
Lukas et al.

[11] Patent Number: 5,876,189
[45] Date of Patent: Mar. 2, 1999

[54] PUMPED FLUID METERING DEVICE FOR THE PRECISE FEEDING OF A FLUID

[75] Inventors: Gus J. Lukas, Manitowoc; Richard E. Berrend, New Holstein, both of Wis.

[73] Assignee: Lube Devices, Inc., Manitowoc, Wis.

[21] Appl. No.: 987,595

[22] Filed: Dec. 9, 1997

[51] Int. Cl.$^6$ .................................................. F04B 17/00
[52] U.S. Cl. .................. 417/392; 417/399; 417/489; 417/269; 417/53; 92/13.6; 60/547.1
[58] Field of Search ...................... 417/392, 399, 417/470, 501, 569, 489, 269; 60/547.1; 92/13.6, 86; 277/117

[56] References Cited

U.S. PATENT DOCUMENTS

| | | | |
|---|---|---|---|
| 2,381,056 | 8/1945 | Huber | 103/5 |
| 3,747,478 | 7/1973 | Dunn et al. | 92/86 |
| 3,884,125 | 5/1975 | Massie | 92/13.5 |
| 4,047,854 | 9/1977 | Penn | 417/489 |
| 4,784,578 | 11/1988 | Gruett | 417/225 |
| 4,784,584 | 11/1988 | Gruett | 417/399 |
| 5,364,111 | 11/1994 | Wunsch | 277/117 |

*Primary Examiner*—Timothy S. Thorpe
*Assistant Examiner*—Paul L. Ratcliffe
*Attorney, Agent, or Firm*—Nilles & Nilles, S.C.

[57] ABSTRACT

A metering device for the precision feeding of a liquid, such as, for example, an oil lubricant. The device has a fluid supply chamber with a working medium such as oil and which in turn is in open communication with a metering chamber also containing the medium fluid. A fluid pumping piston passes through the supply chamber and then into the metering chamber. Upon entering the metering chamber, the pumping piston passes through an annular flexible seal of generally U-shaped cross section that has a pair of axially extending lips which act, respectively, along the piston and the metering chamber to thereby form a one-way valve therebetween. The piston forces the fluid out of the metering chamber and the volume displaced by the piston can be adjusted by adjusting the axial position of the metering chamber and thereby vary the extent to which the pumping piston enters the metering chamber.

47 Claims, 4 Drawing Sheets

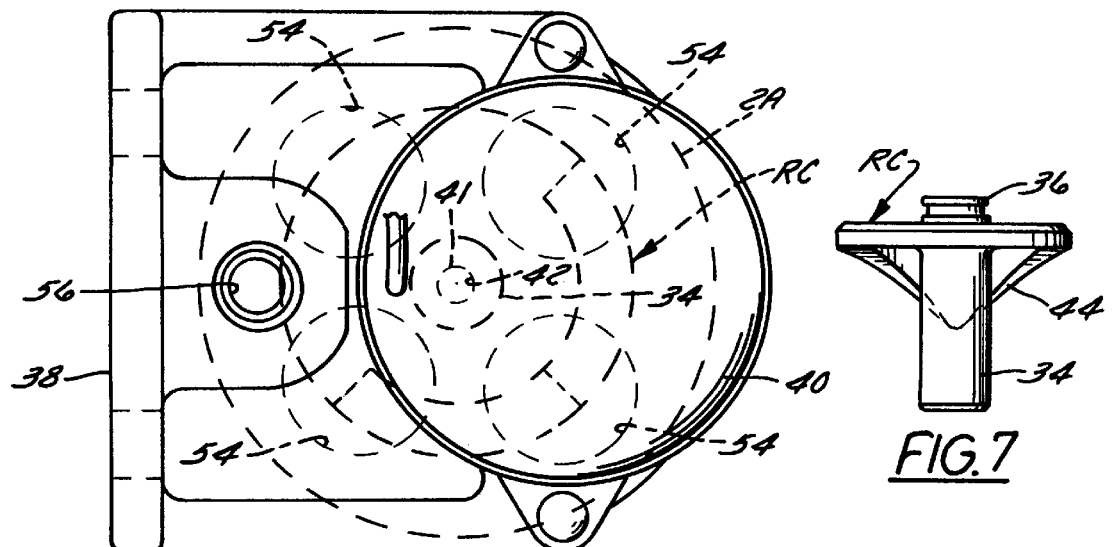
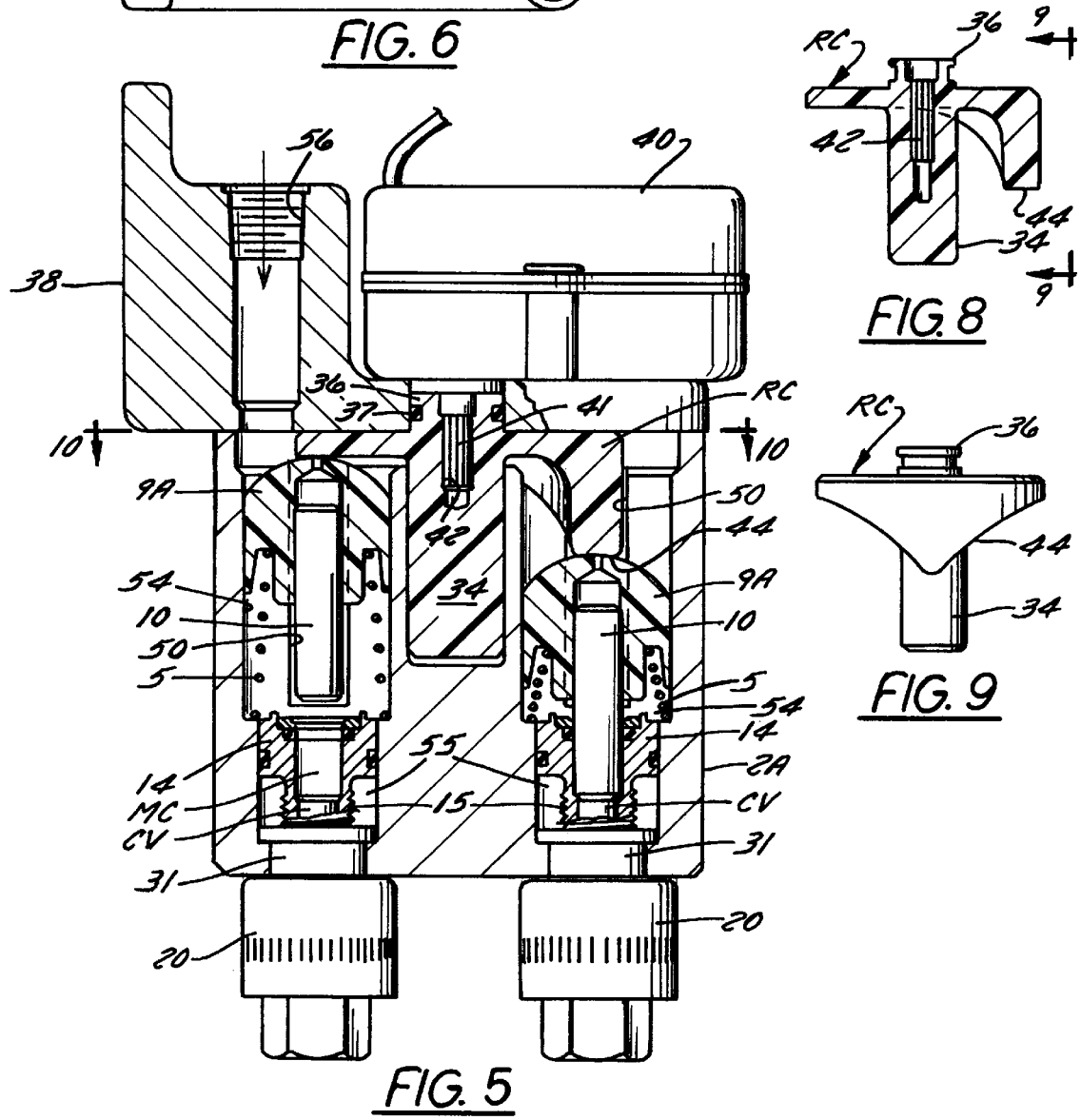

PUMPED FLUID METERING DEVICE FOR THE PRECISE FEEDING OF A FLUID

BACKGROUND OF THE INVENTION

1. Field of the Invention

This invention relates to a metering device for the precision feeding of a liquid such as an oil lubricant, for example.

2. Description of the Prior Art

Examples of the prior art relating to these devices are U.S. Pat. No. 4,784,578, issued Nov. 15, 1988, and U.S. Pat. No. 4,784,584, issued Nov. 15, 1988. These patents utilize a compound, two-piston arrangement including a lost motion connection therebetween and having numerous and complicated parts. It is necessary for the devices of those two patents to ensure that the piston that ultimately delivers the fluid extends past the plane of the end of the liquid chamber so as to ensure that the air is completely dispelled from the liquid.

SUMMARY OF THE INVENTION

The present invention provides a metering device for a liquid which accurately meters minute quantities of fluid and without the entrapment of air in the metered fluid. A more specific aspect of the invention relates to a metering device that has a fluid supply chamber for the fluid and is in open communication with the metering chamber for the fluid, thus filling the metering chamber also. The arrangement is such that a pumping piston passes through the flooded supply chamber and then into the metering chamber where it forms a seal with the metering chamber by means of an annular flexible, generally cup-shaped in cross section seal. This seal is located at the entry end of the metering chamber and adjacent the supply chamber. As the piston moves into the metering chamber, the annular flexible seal acts to seal between the metering chamber and the piston, and the piston continues its movement in a working stroke to force the liquid in the metering chamber out past the check valve. On the working stroke of the piston, the flexible U-shaped seal acts to pressurize the space between the piston and the seal. On the return stroke of the piston, the metering chamber, which has been emptied, is then depressurized and fluid can flow back into the metering chamber past the seals around the piston and liquid again floods into the metering chamber from the supply chamber. Thus, the piston forces oil out of the metering chamber via a one-way check valve and then as the piston is retracted, a vacuum condition occurs in the metering chamber and because of the seal's position and location, fluid is allowed to be drawn into the metering chamber between the seal and the piston as the piston withdraws from the chamber. As the spring retracts the piston, the supply chamber is self-primed.

A more limited aspect of the invention relates to a metering device of the above type in which the U-shaped seal has a pair of axially extending flexible lips, one of which lies along the piston when the latter is in the metering chamber and the other lip lying along the metering chamber wall to thereby form a one-way check valve.

Another more limited aspect of the invention relates to an adjustable means for axially shifting the metering chamber toward and away from the piston, to thereby vary the extent to which the piston enters the metering chamber in its pumping stroke and consequently varies the volume of fluid discharged.

These and other objects and advantages of the present invention will appear herein as this disclosure progresses.

BRIEF DESCRIPTION OF THE DRAWINGS

FIG. 1 is a longitudinal, cross-sectional view through the metering device, with certain parts shown as being broken away for clarity in the drawing, and showing the metering chamber in the retracted position for minimum volume delivery by the piston;

FIG. 2 is a view similar to FIG. 1 but showing the lower portion broken away and showing the pressure relief one-way check valve in the discharge position, and showing the metering chamber in an adjusted position for additional volume of fluid pumped by the piston;

FIG. 3 is an enlarged, fragmentary, sectional view of the juncture between the supply chamber and the metering chamber with the U-shaped annular resilient seal held in its counterbore by the metal retainer located in its counterbore adjacent the seal, and showing the inner lip of the resilient U-shaped seal moved inwardly in the absence of the piston;

FIG. 4 is a sectional view through the check valve shown in FIG. 2, but in an enlarged scale;

FIGS. 5–13 show another embodiment of the invention in which the actuating force is an electric motor driven rotating cam for actuating a number of pumping pistons;

FIG. 5 is a cross-sectional view through the metering pump;

FIG. 6 is a top view of the device shown in FIG. 5;

FIGS. 7, 8 and 9 are views of the rotary cam shown in FIG. 5 but on a slightly reduced scale, FIG. 7 being an elevational view of the cam, FIG. 8 is a sectional view of the cam as shown in FIG. 5, and FIG. 9 being an elevational view of the cam taken generally along the line 9—9 on FIG. 8;

FIG. 10 is a plan view taken along the section line 10—10 in FIG. 5 and showing the housing of this embodiment;

FIG. 11 is a sectional view taken generally along the line 11—11 in FIG. 10 but in perspective;

FIG. 12 is a partial sectional view of the piston lifter shown in FIG. 5; and

FIG. 13 is another view of the piston lifter, in position, with the piston fixed therein.

DESCRIPTION OF THE PREFERRED EMBODIMENTS

FIGS. 1–4

Figures 1, 2:
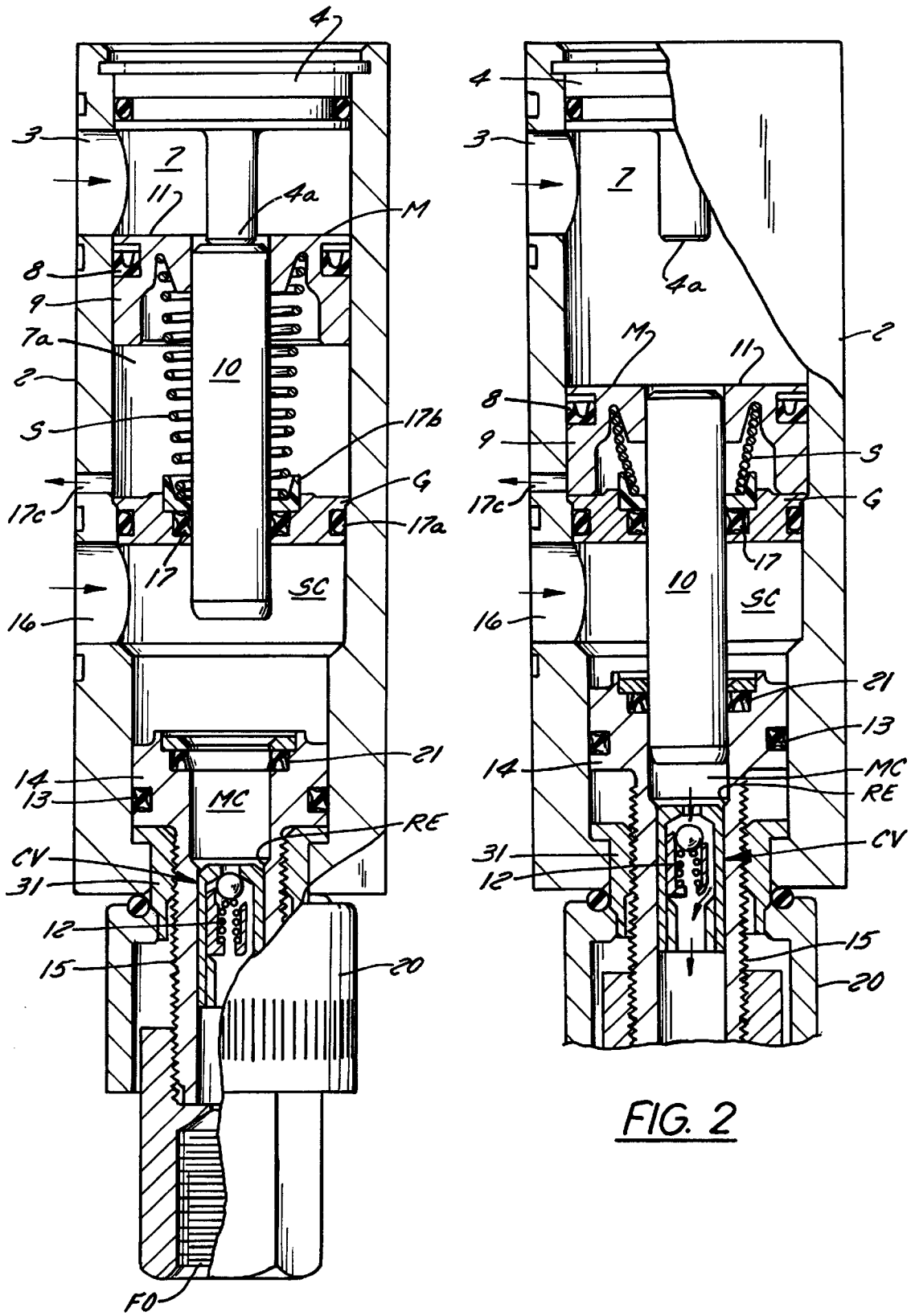
FIGS. 1–4 show an embodiment of the invention in which the actuating force for the pump piston is a fluid operated actuating chamber utilizing compressed air, for example, as the force which drives the pumping piston.

The hydraulic metering device of this invention finds particular utility when located in a liquid medium supply line. In FIGS. 1–4, a pump or gravity reservoir (not shown) delivers a liquid medium to the metering device for the metered flow to an assembly (not shown). The hydraulic metering device can also draw fluid from a lower remote reservoir (not shown) due to its ability to generate a vacuum in the supply chamber when the actuating member M is shifted upwardly by a spring S, as will appear.

In describing the invention, reference may be made to directions, that is up or down, or inner or outer, for convenience in describing the various parts. It should be understood, however, that the device may be operable in any position.

The embodiment shown in FIGS. 1–4 of the present precision pump utilizes an elongated body or hollow cylinder 2 having an inlet 3 and chamber 7 for the reception of an actuating fluid such as compressed air, for example, it being understood that other fluids may be used. The inlet end of the cylinder has a closure member 4 which is fixed therein and includes an integral and inwardly extending stop member 4a. The closure member 4 may be transparent to provide visual verification of operation. The actuating member M takes the form of a fluid piston 9 having a smoothly and accurately finished fluid piston rod 10 fixed thereto. This actuating member M is slidably and sealingly mounted in the pressurizable end chamber 7 of the cylinder, having an annular seal 8 of U-cup cross-sectional shape which is used for low drag and seals only when pressurized fluid enters the inlet end. Member M is urged inwardly by compressed air or other actuating medium which is fed into the inlet end of chamber 7 of the cylindrical housing via fluid inlet 3 and acts on the upper surface 11 of member M.

A fluid medium supply chamber SC is located intermediate the length of the cylinder 2, and the piston 10 of the actuating member M extends into this chamber SC and is guided by the fixed guide G having a quadring flexible seal 17. Guide G also has an O-ring seal 17a with the cylinder 2. Thus, the guide is sealed to cylinder 2 with an O-ring and is sealed to piston 10 with a quadring held in place by a retainer 17b and separates supply chamber SC from vented chamber 7a. An air vent 17c acts to vent chamber 7a. This is required for displacement of piston 9 during actuation. Supply chamber SC is flooded with a working medium such as oil, via inlet 16.

After the piston 9 has been actuated by compressed air in chamber 7 to deliver a pumping stroke to the piston 10, the spring S urges the piston 9 and its piston 10 upwardly in the retracted position shown in FIG. 1. This creates at least a partial vacuum in the supply chamber SC and thus draws fluid into the supply chamber via inlet 16 and from a remote reservoir (not shown) or other supply of the fluid.

A metering chamber MC is located adjacent to and in open fluid communication with the supply chamber SC for receiving the oil from the supply chamber SC as above indicated. Metering chamber MC is of smaller diameter than the supply chamber and forms a juncture therewith.

The fluid piston rod 10 is shown as initially completely withdrawn from the metering chamber MC due to the action of spring S and absence of actuating pressure (FIG. 1). The piston rod 10, when actuating pressure is present in chamber 7, is forced inwardly through chamber SC and enters the flooded metering chamber. The metering chamber MC is formed in a body 14 that in turn is sealingly mounted in the cylindrical housing 2 and is sealed therewith by a conventional resilient annular seal 13 of x-shape cross section, commonly referred to as a quadring, which acts to seal in either direction. The body 14 is also axially adjustable in the housing 2 by means of its externally threaded hollow extension 15. The piston rod 10 forms a pumping fit with the metering chamber. The piston rod 10, at the bottom of its stroke, extends no further than the bottom of the metering chamber MC. It does not extend past the reduced end RE of the chamber MC.

Figure 3:
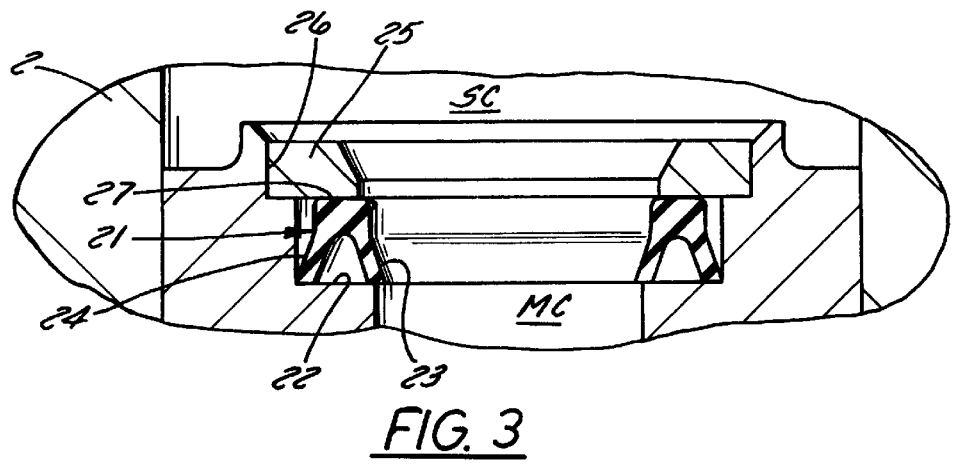

FIG. 3 shows the details of the upper end of the body 14 and particularly its junction with the top edge of the metering chamber MC. An annular resilient seal 21 of cross-sectional U-shape is provided in a counterbore 22 in the upper end of body 14 and around the metering chamber MC. The annular U-shaped or cup-shaped seal ("U-cup") 21 is seated in the counterbore 22 and has an axially extending inner lip 23 and an outer lip 24 extending downwardly from a base-portion 27 thereof. The U-cup 21 is located at the upper end of the metering chamber MC and is held firmly in the counterbore 22 by means of the annular flat retainer 25. The retainer 25 is press fit downwardly in its counterbore 26 and acts against the base portion 27 of the U-cup 21 to hold the latter in position. The outer lip 24 lies along the metering chamber inner wall, and the inner lip 23 extends slightly into the metering chamber (FIG. 3) and against piston 10 (FIG. 2) when the latter enters the metering chamber. The arrangement is that when the metering chamber is pressurized, the U-cup of the seal 21 is pressurized, thus forming a seal with piston 10.

A fluid, such as oil, is available in the supply chamber SC from inlet 16 to fill the cavity inside the metering chamber MC during upstroke of the piston 10 in chamber MC. Specifically, during the upstroke of the piston 10, oil is allowed into the chamber MC from the chamber SC past seal or U-cup 21 and, piston 10 is then withdrawn completely from the chamber MC allowing oil to flood and thereby refill the chamber MC directly from the chamber SC. Any air in chamber MC is displaced by the fluid during this process.

As the pressurized actuating fluid then pushes the piston down and the piston 10 enters the metering chamber MC, pressure is built up in the chamber MC, the seal 21 is energized against the piston 10, thus preventing the oil from moving out of the chamber, past seal 21, and the oil is pushed out of the chamber through the check valve CV. Thus, the seal 21 located at the upper end of the metering chamber MC acts as a one-way check valve. It traps oil in the cylinder as the piston moves down and allows oil to flow into the metering chamber as the piston moves up.

Figure 4:
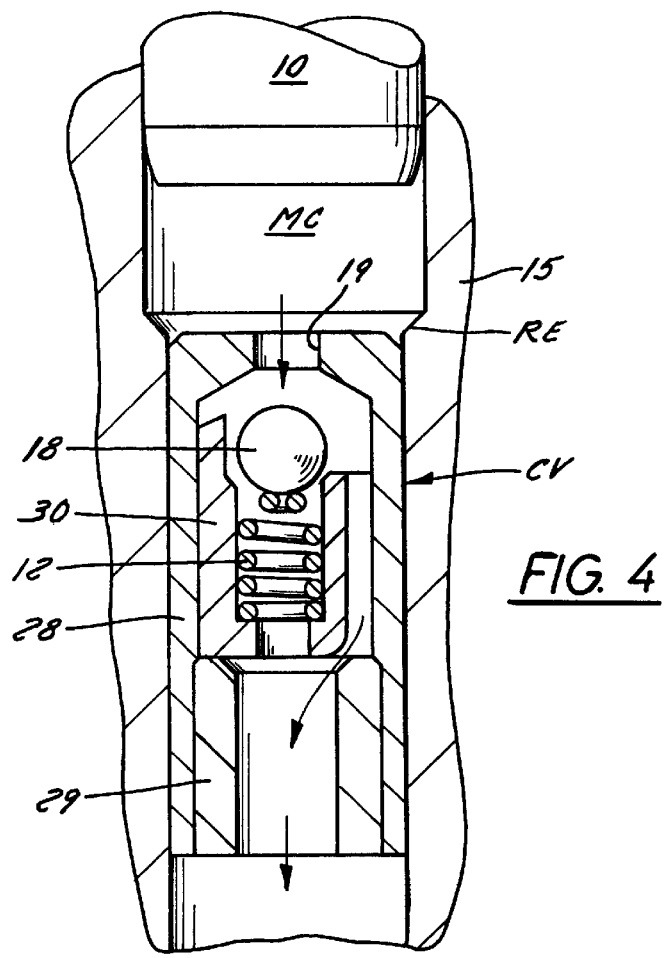
Figure 10:
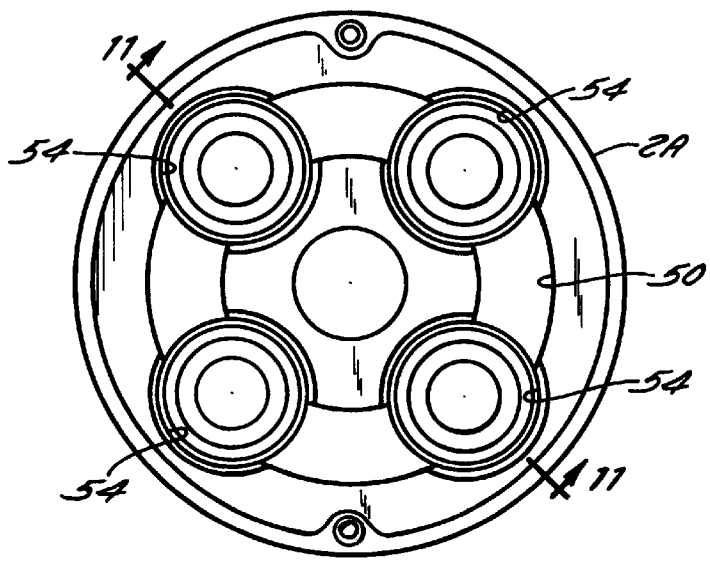
Figure 12:
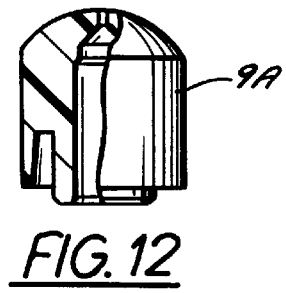
Figure 11:
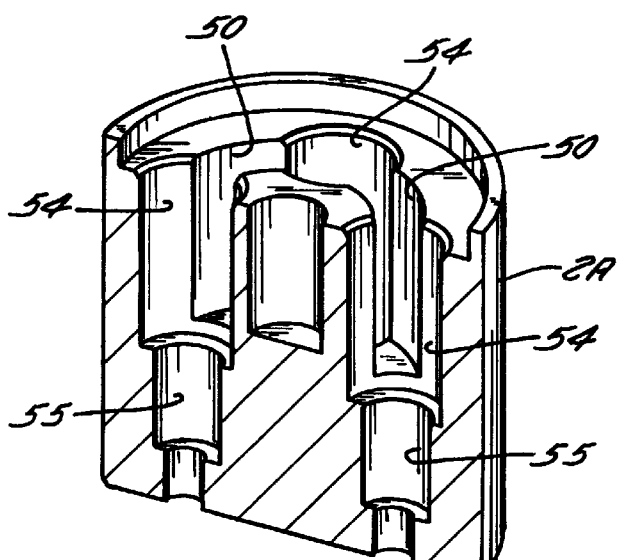
Figure 13:
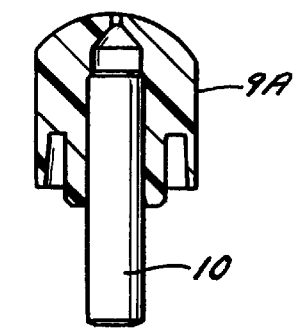

At the discharge end of the metering chamber MC is located a standard one-way ball check valve CV of the spring-loaded ball type which is in communication with the metering chamber and which receives fluid which is pumped from the metering chamber by the fluid piston 10. This check valve is mounted in its own body 28 (FIG. 4). When the pressure of the fluid in the metering chamber MC is sufficient to overcome the setting of a spring 12 of the ball check valve, it discharges through a fluid outlet FO in the end of the housing for conveyance through appropriate conduits.

The one-way check valve CV is shown clearly in FIG. 4 where the hollow body 28 contains the ball 18 that is loaded against the orifice 19 by spring 12. An expander pin 29 is forced into the hollow body 28 by a conventional tool (not shown) and is thereby press fit in the body 28 and against the spring retainer 30.

The axial position of the metering chamber MC within the cylindrical housing (FIG. 1) is axially adjusted by an externally threaded extension 15 that is threadedly engaged in a rotatable bushing 31. Bushing 31 is axially fixed in the housing but manually rotatable therein by a thumb nut 20 which is fixed to the lower end of the bushing 31. This adjustment by nut 20 is conveniently made externally. Rotation of the nut 20 in either direction causes axial movement of the threaded extension 15 of the metering chamber and consequent axial adjustment of the metering chamber MC in the housing 2. FIG. 2 shows the metering chamber when shifted axially toward the piston 10 to increase the flow volume.

Thus the position of the metering chamber MC can be adjusted axially so as to vary the extent to which the piston 10 enters the metering chamber in its pumping stroke and consequently to vary the amount of fluid pumped from the chamber through the one-way check valve CV. Only if the metering pump is set to expel 100% of the oil in the chamber MC does the piston 10 extend all the way down to the reduced end RE. At no time does it extend beyond the reduced end RE.

In operation, the precision metering pump utilizes only one piston 10 which is driven directly by pressure on the actuating member 9 at the inlet end of the cylindrical chamber 7. The piston 10 is forced through the supply chamber SC (which is flooded with fluid such as oil) and into the metering chamber MC which is also flooded with oil. The piston 10 then acts to pump an amount of fluid out of the metering chamber MC and through the check valve CV to the fluid outlet FO of the metering pump. In this manner, the pumping fluid piston 10 is moved directly with a singular motion to pump the desired amount of fluid from the metering chamber. The volume of the fluid displaced from the metering chamber depends upon the position of the metering chamber in an axial direction, as determined by the threadable connection between the threaded cylinder extension 15 and the volume adjust bushing 31 threadedly engaged therewith. In this manner, the free end of the pumping piston rod enters the metering chamber but does not extend past the reduced end RE at the bottom of the metering chamber MC. The metering pump is capable of operating in any position as previously mentioned.

FIGS. 5–13

In this embodiment of the invention, parts similar in construction and function to those shown in FIGS. 1–4 have been similarly numbered or with a letter affixed. Several pumping pistons 10 have been shown arranged circumferentially in the body 2A to successively perform pumping functions via their respective outlets. The pistons in this embodiment are shown as being fixed to a lifter 9A which is spring biased upwardly by the springs 5 and against the rotary cam RC. The rotary cam RC is rotatably mounted in the body by its lower post-like portion 34 and its upper portion 36, the upper portion 36 being sealed by a conventional O-ring seal 37 in the bracket 38 which is fixed on the body 2A. The rotary cam is driven by an electric synchronous motor 40 or the like by its shaft 41 that is engaged in the corresponding hole 42 in the upper side of the cam RC.

In this manner the electric motor 40 rotatably drives the cam RC and the working cam surface 44 of the cam bears against the end of the lifters 9A thereby driving the pistons 10 in their pumping stroke.

An annular, ring-like cylindrical chamber 50 is formed in the body 2A and is in fluid communication and intersects with the cylindrical supply chambers 54 in which the pistons 10 and their associated lifters 9A reciprocate. Stated otherwise, the annular chamber 50 receives fluid from an inlet 56 and this fluid, such as lubricating oil or other materials to be dispensed, is in flooded communication with the fluid supply chambers 54, one being provided for each of the pumping pistons. At the inner end of each supply chamber 54, a counterbore 55 is formed which receives the body 14 containing the metering chamber MC which is flooded with fluid from its respective supply chamber 54 and the juncture between the supply chamber and smaller diameter metering chamber is similar to the modification shown in FIGS. 1 and 2, and particularly as shown in detail in FIG. 3.

At the discharge end of the metering chamber MC is a check valve CV similar in function and operation to that shown in FIGS. 1, 2 and 4. Similarly, the axially adjustable metering chamber body 14 is adjustable by the bushing 31, the threaded extension 15 and nut 20, as shown and described in detail in FIGS. 1 and 2.

Recapitulation

The present invention provides a metering device having a fluid supply chamber which will pull a vacuum to fill itself with a working medium such as oil and which in turn is in open communication with the metering chamber which is also filled with the medium fluid. The metering chamber is of smaller diameter than the supply chamber and forms a juncture therewith. Means are provided for actuating a fluid piston in a pumping mode to thereby force the fluid medium out of the metering chamber. The pumping piston passes through the annular flexible seal of generally U-shaped cross section located between the inlet of the fluid metering chamber located at the juncture of the supply chamber and the metering chamber, and forming a one-way check valve between the piston and the metering chamber. The arrangement is such that the supply chamber and metering chamber are flooded with the fluid and thereby the possibility of entrapped air is minimized to result in precise metering of the fluid. The volume displaced by the piston can be adjusted by means of adjusting the metering chamber axially and thereby vary the extent to which the pumping piston enters the metering chamber. The action of the U-shaped seal is such that its axially extending inner and outer lips act respectively along the piston and the metering chamber to thereby form a one-way check valve therebetween.

What is claimed is:

1. A metering device for a fluid comprising a housing having an elongated hollow cylinder, an inlet end in said cylinder, means for supplying an actuating force in said inlet end, a fluid supply chamber in said cylinder, a fluid piston slidably mounted in said cylinder for being shiftable in a pumping direction in said chamber by said force acting on said piston, means for introducing fluid into said supply chamber to flood the latter, a fluid metering chamber extending from and in fluid communication with said supply chamber and forming a juncture therebetween, said metering chamber being of smaller diameter than said supply chamber and forming an inlet at said juncture for said piston, said fluid piston having a free end extending into said supply chamber and shiftable by said force to enter said inlet and said metering chamber to thereby pump fluid in and through said fluid metering chamber, and an annular flexible seal of a generally U-shaped cross section, said seal surrounding said inlet of said fluid metering chamber when said piston is in said metering chamber to form a one-way check valve between said piston and said metering chamber so as to permit fluid flow therepast into said fluid metering chamber while preventing fluid flow therepast out of said fluid metering chamber, and a pressure relief valve forming a one-way check valve located between said fluid metering chamber and a fluid outlet from said housing for receiving fluid which is pumped from said fluid metering chamber by said fluid piston and discharging said fluid through said fluid outlet.

2. The device as set forth in claim 1 further characterized in that said U-shaped seal has a pair of axially extending inner and outer lips, said outer lip lying along the metering chamber and the inner lip adapted to lie along said piston when the latter is in said metering chamber to thereby form said one-way check valve.

3. The metering device as set forth in claim 1 including a body which is sealingly mounted in said hollow cylinder, and said fluid metering chamber is formed in said body, said body having an elongated externally threaded portion extending axially therefrom, a rotatable and internally threaded bushing threadedly engaged with said elongated threaded portion of said body, said bushing being axially fixed in said hollow cylinder but rotatable therein, and means for rotating said bushing in one direction or another to cause said body and its metering chamber to be axially shifted in said hollow cylinder and thereby vary the extent to which the piston enters the metering chamber and in turn vary the volume of fluid displaced by movement of said piston in said metering chamber.

4. The metering device as set forth in claim 1 including an axially fixed guide located in said hollow cylinder and located between said metering chamber and inlet end of said cylinder, said fluid piston extending through and in sealing and guided relationship with said guide.

5. The device set forth in claim 4 including a compression spring means acting between said guide and said piston to resiliently urge said fluid piston completely out of said metering chamber.

6. A metering device for a fluid comprising a housing having an elongated hollow cylinder, an inlet end in said cylinder, means for supplying an actuating force in said inlet end, a fluid supply chamber in said cylinder, a fluid piston slidably mounted in said cylinder for being shiftable in a pumping direction in said chamber by said force acting on said piston, said supply chamber being self-primed with fluid, said piston having an axial surface which is acted on by said actuating force and a free end which always moves upon movement of said axial surface, a fluid metering chamber extending from and in fluid communication with said supply chamber and forming a juncture therebetween, said metering chamber being of smaller diameter than said supply chamber and forming an inlet at said juncture for said piston, said free end of said fluid piston extending into said supply chamber and shiftable by imposition of said force on said axial surface to enter said inlet and said metering chamber to thereby pump fluid in and through said fluid metering chamber;

a body which is sealingly mounted in said hollow cylinder, and said fluid metering chamber is formed in said body, said body having an elongated externally threaded portion extending axially therefrom, a rotatable and internally threaded bushing threadedly engaged with said elongated threaded portion of said body, said bushing being axially fixed in said hollow cylinder but rotatable therein, and means for rotating said bushing in one direction or another to cause said body and its metering chamber to be axially shifted in said hollow cylinder and thereby vary the extent to which the piston enters the metering chamber and in turn vary the volume of fluid displaced by movement of said piston in said metering chamber; and an annular flexible seal which is of a generally U-shaped cross section, which surrounds said inlet of said fluid metering chamber and which engages said piston when said piston is in said metering chamber so as to form a one-way check valve between said piston and said metering chamber and so as to permit fluid flow therepast into said fluid metering chamber while preventing fluid flow therepast out of said fluid metering chamber, said U-shaped seal having a pair of axially extending inner and outer lips, said outer lip lying along the metering chamber and the inner lip adapted to lie along said piston when the latter is in said metering chamber to thereby form said one-way check valve;

and a pressure relief valve forming a one-way check valve located between said fluid metering chamber and a fluid outlet from said housing for receiving fluid which is pumped from said fluid metering chamber by said fluid piston and discharging said fluid through said fluid outlet.

7. The metering device as set forth in claim 6 including an axially fixed guide located in said hollow cylinder and located between said metering chamber and inlet end of said cylinder, said fluid piston extending through and in sealing and guided relationship with said guide.

8. The metering device set forth in claim 7 including a spring means acting between said guide and said piston to resiliently urge said fluid piston completely out of said metering chamber.

9. A metering device for a fluid having an elongated hollow cylinder, an inlet end in said cylinder, means for supplying an actuating force in said inlet end, a fluid supply chamber in said cylinder, a fluid piston slidably mounted in said cylinder for being shiftable in a pumping direction in said chamber by said force acting on said piston, said supply chamber being self-primed with fluid, a fluid metering chamber extending from and in fluid communication with said supply chamber and forming a juncture therebetween; an axially fixed guide located in said hollow cylinder and located between said metering chamber and inlet end of said cylinder, said fluid piston extending through and in sealing and guided relationship with said guide; a compression spring acting between said guide and said piston to resiliently urge said fluid piston completely out of said metering chamber; said metering chamber being of smaller diameter than said supply chamber and forming an inlet at said juncture for said piston, said fluid piston having a free end extending into said supply chamber and shiftable by said force to enter said inlet and said metering chamber to thereby pump fluid in and through said fluid metering chamber, and an annular flexible seal of a generally U-shaped cross section and surrounding said inlet of said fluid metering chamber and engaging said piston when said piston is in said metering chamber to form a one-way check valve between said piston and said metering chamber that permits fluid flow therepast into said fluid metering chamber while preventing fluid flow therepast out of said fluid metering chamber, said U-shaped seal having a pair of axially extending inner and outer lips, said outer lip lying along the metering chamber and the inner lip adapted to lie along said piston when the latter is in said metering chamber to thereby form said one-way check valve, and a pressure relief valve forming a one-way check valve located between said fluid metering chamber and a fluid outlet from said cylinder for receiving fluid which is pumped from said fluid metering chamber by said fluid piston and discharging said fluid through said fluid outlet.

10. A metering device for a fluid comprising an elongated hollow cylinder, an inlet end chamber forming an actuating chamber, a supply inlet in said cylinder for supplying pressurized air to said actuating chamber, an actuating member slidably and sealingly mounted in said actuating chamber, said actuating member including an axially extending and elongated piston rod, a fluid supply chamber in said cylinder, said piston rod slidably mounted in said cylinder for being shiftable in a pumping direction in said actuating chamber by said pressurized air acting on said actuating member, said supply chamber being self-primed to flood the latter, a fluid metering chamber extending from and in open fluid communication with said supply chamber and forming a juncture therebetween, said metering chamber being of smaller diameter than said supply chamber and forming an entry inlet at said juncture for said piston, said piston rod having a free end extending into said supply chamber and shiftable by said pressurized air to enter said entry inlet and said metering chamber to thereby pump fluid in and through said fluid metering chamber, and an annular flexible seal of a generally U-shaped cross section and surrounding said entry inlet of said fluid metering chamber and engaging said piston when said piston is in said metering chamber to form a one-way check valve between said piston and said metering chamber that permits fluid flow therepast into said fluid metering chamber while preventing fluid flow therepast out of said fluid metering chamber, and a pressure relief valve forming a one-way check valve located between said fluid metering chamber and a fluid outlet from said cylinder for receiving fluid which is pumped from said fluid metering chamber by said fluid piston and discharging said fluid through said fluid outlet.

11. The device as set forth in claim 10 further characterized in that said U-shaped seal has a pair of axially extending inner and outer lips, said outer lip lying along the metering chamber and the inner lip adapted to lie along said piston when the latter is in said metering chamber to thereby form said one-way check valve.

12. The metering device as set forth in claim 10 including a body which is sealingly mounted in said hollow cylinder, and said fluid metering chamber is formed in said body, said body having an elongated externally threaded portion extending axially therefrom, a rotatable and internally threaded bushing threadedly engaged with said elongated threaded portion of said body, said bushing being axially fixed in said hollow cylinder but rotatable therein, and means for rotating said bushing in one direction or another to cause said body and its metering chamber to be axially shifted in said hollow cylinder and thereby vary the extent to which the piston enters the metering chamber and in turn vary the volume of fluid displaced by movement of said piston in said metering chamber.

13. The metering device as set forth in claim 10 including an axially fixed guide located in said hollow cylinder and located between said metering chamber and said actuating chamber of said cylinder, said fluid piston extending through and in sealing and guided relationship with said guide.

14. The device set forth in claim 13 including a resilient acting between said guide and said piston to resiliently urge said fluid piston completely out of said metering chamber.

15. A fluid metering device housing having an elongated hollow cylinder, an inlet end in said cylinder, means for supplying an actuating force in said inlet end, a fluid supply chamber in said cylinder, a fluid piston slidably mounted in said cylinder for being shiftable in a pumping direction in said chamber by said force acting on said piston, means for introducing fluid into said supply chamber to flood the latter, a fluid metering chamber extending from and in fluid communication with said supply chamber and forming a juncture therebetween, said metering chamber being of smaller diameter than said supply chamber and forming an inlet at said juncture for said piston, said fluid piston having a free end extending into said supply chamber and shiftable by said force to enter said inlet and said metering chamber to thereby pump fluid in and through said fluid metering chamber, and a generally U-shaped in cross section annular flexible seal surrounding said inlet of said fluid metering chamber, said U-shaped seal having a pair of axially extending inner and outer lips, said outer lip lying along the metering chamber and the inner lip adapted to lie along said piston and to engage said piston when the latter is in said metering chamber to thereby form a one-way check valve between said piston and said metering chamber that permits fluid flow therepast into said fluid metering chamber while preventing fluid flow therepast out of said fluid metering chamber.

16. The metering device as set forth in claim 15 including a body which is sealingly mounted in said hollow cylinder, and said fluid metering chamber is formed in said body, said body having an elongated externally threaded portion extending axially therefrom, a rotatable and internally threaded bushing threadedly engaged with said elongated threaded portion of said body, said bushing being axially fixed in said hollow cylinder but rotatable therein, and means for rotating said bushing in one direction or another to cause said body and its metering chamber to be axially shifted in said hollow cylinder and thereby vary the extent to which the piston enters the metering chamber and in turn vary the volume of fluid displaced by movement of said piston in said metering chamber.

17. The metering device as set forth in claim 16 including an axially fixed guide located in said hollow cylinder and located between said metering chamber and inlet end of said cylinder, said fluid piston extending through and in sealing and guided relationship with said guide.

18. The device set forth in claim 17 including a compression spring acting between said guide and said piston to resiliently urge said fluid piston completely out of said metering chamber.

19. The metering device as recited in claim 16 including a fluid outlet in said cylinder, said metering chamber having a fluid discharge outlet and said cylinder fluid outlet, and a spring loaded ball check valve between said metering chamber fluid discharge outlet.

20. A fluid metering device comprising a housing having an elongated hollow cylinder including a fluid supply chamber, a fluid inlet for conducting fluid into and flooding said cylinder and said supply chamber, a driven rotary cam in said housing, a fluid piston slidably mounted in said cylinder for being shiftable in a pumping direction in said supply chamber by said cam acting on said piston, a fluid metering chamber extending from and in fluid communication with said supply chamber and forming a juncture therebetween, said metering chamber being of smaller diameter than said supply chamber and forming an inlet at said juncture for said piston, said fluid piston having a free end extending into said supply chamber and shiftable by said cam to enter said inlet and said metering chamber to thereby pump fluid in and through said fluid metering chamber, and an annular flexible seal of a generally U-shaped cross section and surrounding said inlet of said fluid metering chamber and engaging said piston when said piston extends into said metering chamber so as to form a one-way check valve between said piston and said metering chamber that permits fluid flow therepast into said fluid metering chamber while preventing fluid flow therepast out of said fluid metering chamber, and a pressure relief valve forming a one-way check valve located between said fluid metering chamber and a fluid outlet from said housing for receiving fluid which is pumped from said fluid metering chamber by said fluid piston and discharging said fluid through said fluid outlet.

21. A fluid metering device comprising a housing, a plurality of fluid pistons arranged in circumferentially spaced relationship in said housing, a fluid supply chamber in said housing for each of said pistons, said fluid pistons slidably mounted in said housing for being shiftable in a pumping direction, a fluid inlet for conducting fluid into and flooding said housing and said supply chambers, a driven rotary cam in said housing for driving said pistons in said pumping direction, a plurality of fluid metering chambers each extending from and in fluid communication with one of said supply chambers and forming a juncture therebetween, said metering chambers being of smaller diameter than said supply chambers and forming inlets at said junctures for said pistons, each of said pistons having a free end extending into the associated supply chamber and shiftable by said cam to enter the associated inlet and metering chamber to thereby pump fluid in and through said metering chamber, and an annular flexible seal which is of a generally U-shaped cross section and which surrounds each said inlet of each said fluid metering chamber, wherein each said flexible seal engages an associated piston when said piston extends into the inlet of the associated fluid metering chamber to form a one-way check valve between the associated piston and the associated metering chamber that permits fluid flow therepast into the fluid metering chamber while preventing fluid flow therepast out of the metering chamber.

22. The device as set forth in claim 21 including, a pressure relief valve forming a one-way check valve located between each of said fluid metering chambers and a fluid outlet from said housing for receiving fluid which is pumped from said fluid metering chamber by said fluid piston and discharging said fluid through said fluid outlet.

23. The device described in claim 21 further characterized in that said U-shaped seal has a pair of axially extending inner and outer lips, said outer lip lying along the metering chamber and the inner lip adapted to lie along said piston when the latter is in said metering chamber to thereby form said one-way check valve.

24. The metering device as set forth in claim 21 including a body which is sealingly and slidably mounted in each of said supply chambers, and said fluid metering chambers are formed one in each in said bodies, said bodies each having an elongated externally threaded portion extending axially therefrom, a rotatable and internally threaded bushing threadedly engaged with each said elongated threaded portion of said bodies, said bushings being axially fixed in said hollow cylinder but rotatable therein, and means for rotating said bushings in one direction or another to cause its respective body and its metering chamber to be axially shifted and thereby vary the extent to which the corresponding piston enters its metering chamber and in turn vary the volume of fluid displaced by movement of said piston in said metering chamber.

25. The metering device described in claim 21 including a motor mounted on said housing and having a driving connection with said rotary cam for driving the latter.

26. A fluid metering device comprising a housing, a plurality of fluid pistons arranged in circumferentially spaced relationship in said housing, a fluid supply chamber in said housing for each of said pistons, said fluid pistons slidably mounted in said housing for being shiftable in a pumping direction, a fluid inlet for conducting fluid into and flooding said housing and said supply chambers, a driven rotary cam in said housing for driving said pistons in said pumping direction, an electric, synchronous motor mounted on said housing and having a driving connection with said rotary cam for driving the latter;

a fluid metering chamber extending from and in fluid communication with each of said supply chambers and forming a juncture therebetween, said metering chambers being of smaller diameter than said supply chambers and forming an inlet at said juncture for said pistons, each of said fluid pistons having a free end extending into the associated supply chamber and shiftable by said cam to enter the inlet of the associated metering chamber to thereby pump fluid in and through the associated fluid metering chamber, a body which is sealingly and slidably mounted in each of said supply chambers, and wherein said fluid metering chambers are formed one in each in said bodies, said bodies each having an elongated externally threaded portion extending axially therefrom, a rotatable and internally threaded bushing threadedly engaged with each said elongated threaded portion of said bodies, said bushings being axially fixed in said hollow cylinder but rotatable therein, and means for rotating said bushings in one direction or another to cause its respective body and its metering chamber to be axially shifted and thereby vary the extent to which the corresponding piston enters its metering chamber and in turn vary the volume of fluid displaced by movement of said piston in said metering chamber, an annular flexible seal which is of a generally U-shaped cross section and which surrounds said inlet of each said fluid metering chamber, wherein, when the piston extends into said inlet of the associated fluid metering chamber, said seal engages said piston to form a one-way check valve between said piston the associated metering chamber that permits fluid flow therepast into the metering chamber while preventing fluid flow therepast out of the metering chamber, wherein said U-shaped seal has a pair of axially extending inner and outer lips, said outer lip lying along the metering chamber and the inner lip adapted to lie along said piston when the latter is in said metering chamber to thereby form said one-way check valve; and a pressure relief valve forming a one-way check valve located between each of said fluid metering chambers and a fluid outlet from said housing for receiving fluid which is pumped from said fluid metering chamber by said fluid piston and discharging said fluid through said fluid outlet.

27. A metering device for oil comprising a housing having an elongated hollow cylinder, an inlet end in said cylinder for receiving an actuating force of compressed air, an oil supply chamber in said cylinder, a fluid piston slidably mounted in said cylinder for being shiftable in a pumping direction in said supply chamber by said compressed air acting on said piston, an oil inlet for introducing oil into said supply chamber to flood the latter, an oil metering chamber extending from and in fluid communication with said supply chamber, said fluid piston extending into said supply chamber and shiftable by said compressed air to move in a pumping stroke in said oil metering chamber to thereby pump oil from said oil metering chamber, and seal means for forming a one-way check valve between said piston and said oil metering chamber during said pumping stroke so as to permit oil flow therepast into said oil metering chamber while preventing oil flow therepast out of said oil metering chamber, said seal means comprising an annular flexible seal which engages both said piston and said oil metering chamber during said pumping stroke, an oil outlet from said housing, and a spring loaded check valve forming a one-way check valve located between said oil metering chamber and said oil outlet from said housing for receiving oil which is pumped from said oil metering chamber by said fluid piston and discharging said oil through said oil outlet.

28. The metering device as set forth in claim 27 including an axially fixed piston guide located in said hollow cylinder and located between said metering chamber and said inlet end of said cylinder, said fluid piston extending through and in sealing and guided relationship with said guide.

29. The device as set forth in claim 28 including a fluid seal located between said guide and said piston, a retainer ring located around said piston, and a spring located around said piston and acting between said retainer ring and said piston which urges said piston in a direction opposite to said pumping stroke.

30. The oil metering device as set forth in claim 27 further characterized in that said one-way flexible seal acts to prevent fluid flow between said piston and said oil metering chamber during said pumping stroke of said fluid piston in said metering chamber.

31. The metering device as set forth in claim 30 including an axially fixed piston guide located in said hollow cylinder and located between said metering chamber and said inlet end of said cylinder, said fluid piston extending through and in sealing and guided relationship with said guide.

32. The device as set forth in claim 30 including a fluid seal located between said guide and said piston, a retainer ring located around said piston, and a spring located around said piston and acting between said retainer ring and said piston which urges said piston in a direction opposite to said pumping stroke.

33. A metering device for oil comprising a housing having an elongated hollow cylinder, an inlet end in said cylinder for receiving an actuating force of compressed air, an oil supply chamber in said cylinder, a fluid piston slidably mounted in said cylinder for being shiftable in a pumping direction in said supply chamber by said compressed air acting on said piston, said piston having an axial surface which is acted upon by said compressed air and a free end which always moves upon movement of said axial surface, an oil inlet for introducing oil into said supply chamber to flood the latter, an oil metering chamber extending from and in fluid communication with said supply chamber;

an axially fixed piston guide located in said hollow cylinder and located between said metering chamber and said inlet end of said cylinder, said fluid piston extending through and in sealing and guiding relationship with said guide; said fluid piston extending into said supply chamber and shiftable by said compressed air to move in a pumping stroke during which said free end moves downwardly within said oil metering chamber to thereby pump oil from said oil metering chamber, and seal means for forming a one-way check valve between said piston and said oil metering chamber during said pimping stroke so as to permit oil flow therepast into said oil metering chamber while preventing oil flow therepast out of said oil metering chamber, said seal means comprising an annular flexible seal which engages both said piston and said oil metering chamber during said pumping stroke;

a fluid seal located between said guide and said piston, a retainer ring located around said piston, and a spring acting between said retainer ring and said piston which urges said piston in a direction opposite to said pumping stroke;

an oil outlet from said housing, and a spring loaded ball check valve forming a one-way check valve located between said oil metering chamber and said oil outlet from said housing for receiving oil which is pumped from said oil metering chamber by said fluid piston and discharging said oil through said oil outlet.

34. The device as described in claim 27 further characterized in that said annular flexible seal is of generally U-shaped cross section.

35. The device set forth in claim 34 further characterized in that said U-shaped seal has a pair of axially extending inner and outer lips, said outer lip lying along the metering chamber and the inner lip adapted to lie along said piston when the latter is in said metering chamber to thereby form said one-way check valve.

36. A fluid metering device comprising a housing having an elongated hollow cylinder including a fluid supply chamber, a fluid inlet for conducting fluid into and flooding said cylinder and said supply chamber, a driven rotary cam in said housing, a fluid piston slidably mounted in said cylinder for being shiftable in a pumping direction in said chamber by said cam acting on said piston, a fluid metering chamber extending from and in fluid communication with said supply chamber and forming a juncture therebetween, said metering chamber being of smaller diameter than said supply chamber and forming an inlet at said juncture for said piston, said fluid piston having a free end extending into said supply chamber and shiftable by said cam to enter said inlet and said metering chamber during a pumping stroke to thereby pump fluid in and through said metering chamber, and seal means for forming a one-way check valve between said piston and said oil metering chamber during said pumping stroke so as to permit oil flow therepast into said oil metering chamber while preventing oil flow therepast out of said oil metering chamber, said seal means comprising an annular flexible seal which engages both said piston and said oil metering chamber during said pumping stroke, and a pressure relief valve forming a one-way check valve located between said metering chamber and a fluid outlet from said housing for receiving fluid which is pumped from said metering chamber by said fluid piston and discharging said fluid through said fluid outlet.

37. The device as described in claim 36 further characterized in that said annular flexible seal is of generally U-shaped cross section.

38. The device set forth in claim 37 further characterized in that said U-shaped seal has a pair of axially extending inner and outer lips, said outer lip lying along the metering chamber and the inner lip adapted to lie along said piston when the latter is in said metering chamber to thereby form said one-way check valve.

39. A fluid metering device comprising a housing, a plurality of fluid pistons arranged in circumferentially spaced relationship in said housing, a fluid supply chamber in said housing for each of said pistons, said fluid pistons slidably mounted in said housing for being shiftable in a pumping direction, a fluid inlet for conducting fluid into and flooding said housing and said supply chambers, a driven rotary cam in said housing for driving said pistons in said pumping direction, a fluid metering chamber extending from and in fluid communication with each of said supply chambers and forming a juncture therebetween, said fluid metering chambers being of smaller diameter than said supply chambers and forming an inlet at said juncture for said piston, said fluid pistons having a free end extending into said supply chamber and shiftable by said cam to enter its respective said inlet and said fluid metering chamber during a pumping stroke to thereby pump fluid in and through said fluid metering chamber, and seal means for forming a one-way check valve between said pistons and their respective metering chambers during said pumping stroke so as to permit oil flow therepast into the associated oil metering chambers while preventing oil flow therepast out of the associated oil metering chambers, said seal means comprising a plurality of annular flexible seals, each of which engages both an associated piston and an associated metering chamber during a pumping stroke of the associated piston.

40. The device as described in claim 39 further characterized in that said annular flexible seal is of generally U-shaped cross section.

41. The device set forth in claim 40 further characterized in that said U-shaped seal has a pair of axially extending inner and outer lips, said outer lip lying along the metering chamber and the inner lip adapted to lie along said piston when the latter is in said metering chamber to thereby form said one-way check valve.

42. A metering device for oil comprising:
    a housing having an elongated hollow cylinder in which is formed 1) an air inlet for receiving compressed air, 2) an oil supply chamber, 3) an oil inlet for introducing oil into said supply chamber, 4) an oil metering chamber extending from and in fluid communication with said supply chamber, and 5) an oil outlet for receiving oil from said metering chamber;
    a piston slidably mounted in said cylinder, said piston being shiftable in a pumping direction under an actuating force imposed by said compressed air, wherein, during a pumping stroke of said piston in said pumping direction, said piston moves through said metering chamber to thereby pump oil from said metering chamber;
    seal means for forming a one-way check valve between said piston and said oil metering chamber during said pumping stroke so as to permit oil flow therepast into said oil metering chamber while preventing oil flow therepast out of said oil metering chamber, said seal means comprising an annular flexible seal which engages both said piston and said metering chamber during said pumping stroke; and
    a spring loaded one-way check valve located between said metering chamber and said oil outlet, said spring loaded check valve receiving oil which is pumped from said metering chamber by said piston and discharging said oil through said oil outlet.

43. A metering device for oil comprising:
    a housing having an elongated hollow cylinder in which is formed 1) an air inlet for receiving compressed air, 2) an oil supply chamber, 3) an oil inlet for introducing oil into said supply chamber, 4) an oil metering chamber extending from and in fluid communication with said supply chamber, and 5) an oil outlet for receiving oil from said metering chamber;
    a piston slidably mounted in said cylinder, said piston being shiftable in a pumping direction under an actuating force imposed by said compressed air, said piston having an axial surface which is acted upon by said compressed air and having a free end which always moves upon movement of said axial surface, wherein, during at a pumping stroke of said piston in said pumping direction, said free end of said piston moves through said metering chamber to thereby pump oil from said metering chamber;
    seal means for forming a one-way check valve between said piston and said oil metering chamber during said pumping stroke so as to permit oil flow therepast into said oil metering chamber while preventing oil flow therepast out of said oil metering chamber, said seal means comprising an annular flexible seal which engages both said piston and said metering chamber during said pumping stroke; and
    a spring loaded check valve forming a one-way check valve located between said metering chamber and said oil outlet, said spring loaded check valve receiving oil which is pumped from said metering chamber by said piston and discharging said oil through said oil outlet.

44. A metering device as defined in claim 43, wherein said free end of said piston withdraws from said metering chamber after said pumping stroke.

45. A metering device for oil comprising:
    a housing having an elongated hollow cylinder in which is formed 1) an air inlet for receiving compressed air, 2) an oil supply chamber, 3) an oil inlet for introducing oil into said supply chamber to flood the latter, 4) an oil metering chamber extending from and in fluid communication with said supply chamber, and 5) an oil outlet for receiving oil from said metering chamber;
    a piston slidably mounted in said cylinder, said piston being shiftable in a pumping direction in said supply chamber under an actuating force imposed by said compressed air, said piston having an axial surface which is acted upon by said compressed air and having a free end which always moves upon movement of said axial surface, wherein, during a pumping stroke of said piston in said pumping direction, said free end of said piston moves through said metering chamber to thereby pump oil from said metering chamber;
    seal means for forming a one-way check valve between said piston and said oil metering chamber during said pumping stroke so as to permit oil flow therepast into said oil metering chamber while preventing oil flow therepast out of said oil metering chamber, said seal means comprising an annular flexible seal which engages both said piston and said metering chamber during said pumping stroke; and
    a spring loaded check valve located between said metering chamber and said oil outlet, said spring loaded check valve receiving oil which is pumped from said metering chamber by said piston and discharging said oil through said oil outlet.

46. A method of supplying metered quantities of oil comprising:
    providing a housing having an elongated hollow cylinder, an air inlet end in said cylinder, an oil supply chamber in said cylinder, a fluid piston slidably mounted in said cylinder, and an oil metering chamber extending from and in fluid communication with said oil supply chamber;
    admitting oil into said oil supply chamber and said oil metering chamber;
    admitting compressed air into said air inlet of said cylinder;
    shifting said fluid piston in a pumping direction in said supply chamber by said compressed air acting on said piston, wherein, during at least a portion of the shifting step, said piston moves in a pumping stroke in said oil metering chamber to thereby pump oil from said oil metering chamber, and wherein, during said pumping stroke, an annular flexible seal engages both said piston and said metering chamber and forms a one-way check valve between said piston and said oil metering chamber so as to permit oil flow therepast into said oil metering chamber while preventing oil flow therepast out of said oil metering chamber; and
    as a result of the shifting step, pumping said oil from said oil metering chamber, through a spring loaded check valve located between said oil metering chamber and said oil outlet, and out of an oil outlet of said housing.

47. A method of supplying metered quantities of oil comprising:
    providing a housing having an elongated hollow cylinder, an air inlet end in said cylinder, an oil supply chamber in said cylinder, a fluid piston slidably mounted in said cylinder and having a free end and an axial surface which always move together with one another, and an oil metering chamber extending from and in fluid communication with said oil supply chamber;

admitting oil into said oil supply chamber and said oil metering chamber;

admitting compressed air into said air inlet of said cylinder;

shifting said fluid piston in a pumping direction in said supply chamber by said compressed air acting on said axial surface of said piston, wherein, during at least a portion of the shifting step, said free end of said piston moves in a pumping stroke in said oil metering chamber to thereby pump oil from said oil metering chamber, and wherein, during said pumping stroke, an annular flexible seal engages both said piston and said metering chamber and forms a one-way check valve between said piston and said oil metering chamber so as to permit oil flow therepast into said oil metering chamber while preventing oil flow therepast out of said oil metering chamber; and as a result of the piston shifting step, pumping said oil from said oil metering chamber, through a spring loaded check valve located between said oil metering chamber and said oil outlet, and out of an oil outlet of said housing.

* * * * *